United States Patent [19]

DiGiulio et al.

[11] Patent Number: 5,435,515
[45] Date of Patent: Jul. 25, 1995

[54] ADUSTABLE, ISO-ELASTIC SUPPORT APPARATUS

[75] Inventors: Arnold DiGiulio, Encino; Edmund DiGiulio, Malibu, both of Calif.; Garrett W. Brown, 515 Addison Ct., Philadelphia, Pa. 19147; Donald E. Wetzel, Arcadia, Calif.

[73] Assignee: Garrett W. Brown, Philadelphia, Pa.

[21] Appl. No.: 215,283

[22] Filed: Mar. 21, 1994

Related U.S. Application Data

[63] Continuation-in-part of Ser. No. 945,105, Sep. 15, 1992, Pat. No. 5,360,196.

[51] Int. Cl.⁶ .................................................. F16M 13/00
[52] U.S. Cl. ................................. 248/576; 224/908; 248/280.1; 248/281.1; 248/123.1; 352/243; 354/82
[58] Field of Search ............... 248/179, 123.1, 280.1, 248/281.1, 179, 576; 352/243; 354/82; 224/908

[56] References Cited

U.S. PATENT DOCUMENTS

| Re. 32,213 | 7/1986 | Brown . |
| 1,040,575 | 10/1912 | Pieper . |
| 1,246,859 | 11/1917 | Boyd . |
| 1,255,185 | 2/1918 | Lehmkuhl . |
| 2,007,215 | 7/1935 | Remey . |
| 3,995,797 | 12/1976 | Knight . |
| 4,017,168 | 4/1977 | Brown . |
| 4,156,512 | 5/1979 | Brown . |
| 4,158,488 | 6/1979 | Gottschalk et al. . |
| 4,158,489 | 6/1979 | Gottschalk et al. . |
| 4,158,490 | 6/1979 | Gottschalk et al. . |
| 4,206,983 | 6/1980 | Nettman et al. . |
| 4,208,028 | 6/1980 | Brown et al. . |
| 4,394,075 | 7/1983 | Brown et al. . |
| 4,474,439 | 10/1984 | Brown . |
| 4,591,122 | 5/1986 | Kreuzer . |
| 4,685,649 | 8/1987 | McKay . |
| 4,852,842 | 8/1989 | O'Neill ........................ 248/123.1 X |
| 4,867,405 | 9/1989 | Nakamura ..................... 248/281.1 |
| 4,976,387 | 12/1990 | Spianti . |
| 5,037,053 | 8/1991 | Fox et al. . |
| 5,042,763 | 8/1991 | Wong . |
| 5,213,293 | 5/1993 | Muentener ...................... 248/123.1 |
| 5,340,072 | 8/1994 | Halbirt ...................... 248/280.1 X |
| 5,348,260 | 9/1994 | Acevedo ..................... 248/280.1 |

FOREIGN PATENT DOCUMENTS

| 2188907 | 1/1974 | France . |
| 2359361 | 2/1978 | France . |
| 2380492 | 9/1978 | France . |
| 944564 | 12/1963 | United Kingdom . |
| 691797 | 10/1979 | U.S.S.R. . |
| 8806695 | 9/1988 | WIPO . |

Primary Examiner—J. Franklin Foss
Attorney, Agent, or Firm—Weiser & Associates

[57] ABSTRACT

The support arm of a camera stabilizing device is provided with a tensioning assembly which is mated to the support arm in a fashion which permits continuous adjustment of the geometric relationship between the end points of the tensioning assembly and the remaining structures which comprise the support arm. This can include adjustment of the frame of the support arm, or adjustment of an end point of the tensioning assembly relative to the frame of the support arm using a cable and drum arrangement coupled with a spring of appropriate size and tension.

40 Claims, 12 Drawing Sheets

ADJUSTABLE, ISO-ELASTIC SUPPORT APPARATUS

RELATED CASE

This is a continuation-in-part of prior U.S. patent application Ser. No. 07/945,105, filed Sep. 15, 1992, now U.S. Pat. No. 5,360,196.

BACKGROUND OF THE INVENTION

This invention relates generally to equipment supports, and more particularly, to portable equipment utilized in conjunction with motion picture film or video cameras.

In employing motion picture film cameras or video cameras to capture a sequence of images, it is extremely important to maintain the camera which is used in as stable a position as possible in order to obtain a high quality result. This is important in eliminating the effects of undesirable camera motion while in use. This is particularly desirable when employing such cameras under conditions wherein it is necessary or desirable for the camera to be mobile, or subjected to movement to acquire the images which are desired.

In order to overcome these problems, and to reduce the expense encountered in producing motion picture films and video productions, the "Steadicam ®" portable camera stabilizing device was developed. Using this device, which has become a de-facto standard in the industry, high quality results have been obtainable in a variety of circumstances. This is so even when the camera operator walks or runs with the camera because of the attendant increase in stability, particularly in stabilizing quick angular deviations along the axes of pan, tilt and roll, which previously could not be adequately controlled.

Further detail regarding the "Steadicam ®" camera stabilizing device may be found with reference to U.S. Pat. No. Re. 32,213 (formerly U.S. Pat. No. 4,017,168); U.S. Pat. No. 4,156,512; and 4,474,439. A key component of this device is the so-called "arm" which serves as the interface between the frame which supports the camera and its ancillary components (e.g., battery packs, view finders, remote control equipment, etc.) and the body harness which is worn by the camera operator. Further detail regarding this support arm may be found with reference to U.S. Pat. Nos. 4,208,028 and 4,394,075.

The support arm disclosed in U.S. Pat. Nos. 4,208,028 and 4,394,075 is generally comprised of a pair of substantially friction-free arm sections which are rotatably and pivotally interconnected at a hinge bracket. Each arm section is formed as a parallelogram, and is provided with segmented springs which are designed to apply a constant force to compensate for the weight applied to the end of the support arm. As a result of this, the weight carried by the support arm is spatially decoupled from the body mounting to increase isolation of the weight from the operator as well as the camera support itself.

A principal design feature of the support arm, which is critical to proper functioning of the "Steadicam ®" camera stabilizing device, is the ability of the support arm to support the fixed weight of the overall system from its lowest to its highest point of articulation with a relatively constant amount of positive "buoyancy". This ability is generally referred to as "iso-elasticity", and the maintenance of such iso-elasticity is quite critical in ensuring effective operations of the "Steadicam ®" camera stabilizing device.

The mechanical principles and geometry of the support arm disclosed in U.S. Pat. Nos. 4,208,028 and 4,394,075 are perfectly valid for a variety of different types of cameras. However, a particular design was only found to be valid for a particular type of camera, primarily due to weight considerations, and was found not to be readily adaptable to different types of cameras. Nevertheless, in practice, use of the "Steadicam ®" camera stabilizing device has generally come to require its use in conjunction with different types of cameras. This is because practicalities such as space availability and cost considerations tend to prevent the dedication of different camera stabilizing devices to the different cameras necessary for a particular production. Consequently, means for adjusting the support capabilities of the arm of the "Steadicam ®" camera stabilizing device have become an ever-increasing consideration.

Responding to this need, adjustability has been provided for by altering the tension of the springs used in conjunction with the arm sections of the support arm in order to increase or decrease the load characteristics of the resulting spring set. While this allowed cameras of different weight to be supported by the arm, it was found that the desired positive buoyancy for the arm was only valid in one position of its vertical articulation. In other words, the feature of isoelasticity was lost. What is more, the adjustments required for altering spring tension were significant and time consuming, and therefore to be avoided.

Also to consider is that in some cases, it was found that perfect iso-elasticity is not ideal since it is desirable for the support arm to have a slight tendency to float at a desired height, with a minimal but consistent force required to fully raise or lower the support arm when in use. In such cases, an ability to adjust the degree of iso-elasticity of the support arm would be useful to conform to the requirements of different kinds of shooting (e.g., vehicle shots or the like, which require a firmer "ride" of the suspended equipment).

In practice it was found that while a given support arm would exhibit iso-elasticity when tensioned to the precise design parameters for a given spring configuration, an adjustment of the degree of iso-elasticity was not possible. At times, the camera stabilizing device tended toward an uncontrollable, "hard ride" when the springs were detensioned (e.g., to accommodate lighter cameras). Even for properly established, iso-elastic spring tensions, difficulties were encountered. Slight variations in the geometry of the support arm while under load sometimes caused the arm to be, in effect, overly iso-elastic. This led to an undesirable tendency of the support arm to lift more strongly at its highest excursion, and less strongly at its lowest. In such cases, the support arm required bumpers to restrict its highest and lowest travel in order to prevent the support arm from locking up at these extreme positions.

SUMMARY OF THE INVENTION

Accordingly, it is a primary object of the present invention to provide an adjustable, iso-elastic support arm for a stabilizing device.

It is also an object of the present invention to provide an adjustable, iso-elastic support arm for a stabilizing device which can operate in conjunction with camera equipment to obtain stabilized motion picture film or video images.

It is also an object of the present invention to provide an adjustable, iso-elastic support arm for a camera stabilizing device which can effectively support cameras of different weights.

It is also an object of the present invention to provide an adjustable, iso-elastic support arm for a camera stabilizing device which can receive cameras of different weights while maintaining a positive buoyancy for each camera, and which can maintain its iso-elastic character throughout its anticipated vertical articulation.

It is also an object of the present invention to provide an adjustable, iso-elastic support arm for a camera stabilizing device which can provide for adjustment of the contour and degree of iso-elasticity established for the support arm, substantially independently of its adjustment for supporting cameras of different weights.

It is also an object of the present invention to provide an adjustable, iso-elastic support arm for a camera stabilizing device which is easily adjusted to accommodate cameras of different weight making use of simplified adjustments which are easily performed and well suited to field use.

It is also an object of the present invention to provide an adjustable, iso-elastic support arm for a camera stabilizing device which can effectively accommodate cameras of different weight without in any way compromising the other operative characteristics of the camera stabilizing device when in use.

These and other objects which will be apparent are achieved in accordance with the present invention by providing the support arm for the camera stabilizing device with a tensioning assembly which is mated to the support arm in a fashion which permits continuous adjustment of the geometric relationship between the end points of the tensioning assembly and the remaining structures which comprise the support arm. This can include adjustments in the frame of the support arm, but preferably involves adjustment of an end point of the tensioning assembly relative to the frame of the support arm using one of several different cable and drum arrangements coupled with a spring of appropriate size and tension.

Further in accordance with the present invention, the contour and degree of iso-elasticity is varied by providing for both fixed angular and adjustable lateral displacement of the path of adjustment for the end point of the tensioning assembly from its nominal path.

For further detail regarding preferred embodiment support arms produced in accordance with the present invention, reference is made to the detailed description which is provided below, taken in conjunction with the following illustrations.

Figure 16:
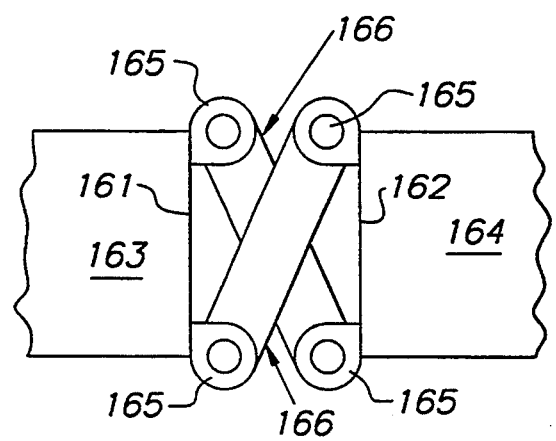
FIG. 16 is a top plan view of a preferred embodiment hinge mechanism.

FIG, 17 is a side elevational view of the hinge mechanism of FIG. 16.

In the several views provided, like reference numbers denote similar structures.

DETAILED DESCRIPTION OF THE PREFERRED EMBODIMENTS

Figures 1, 2:
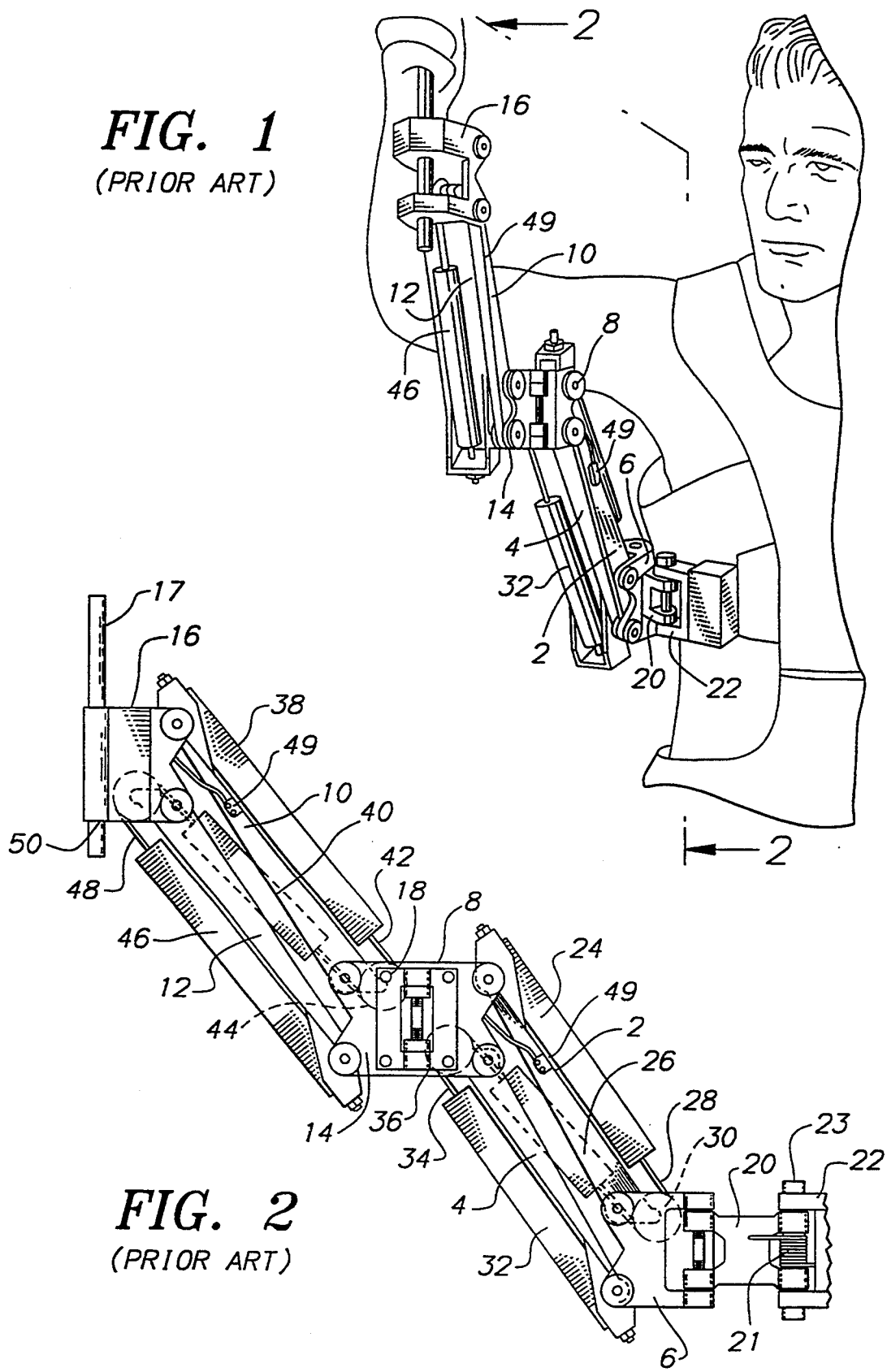
FIG. 1 is a perspective view showing a camera stabilizing support of the prior art, as used, but without a camera mounted thereon.
FIG. 2 is a side elevational view of the support arm of the camera supporting apparatus of FIG. 1.

FIGS. 1 and 2 illustrate a support apparatus of the type which is conventionally used to obtain stabilized motion picture film and video images, and which is generally offered for sale by Cinema Products Corporation under the trademark "Steadicam®". As illustrated, the support arm for the apparatus includes a pair of parallel upper arms links 2, 4 which are pivotally coupled at one end to a connector hinge bracket 6. The other ends of the upper arm links 2, 4 are pivotally coupled to an upper arm medial hinge bracket 8. A second pair of parallel forearm links 10, 12 are pivotally coupled between a forearm medial bracket 14 and a camera support bracket 16. A camera mounting pin 17 is provided in the camera support bracket 16.

The upper arm medial bracket 8 and the forearm medial bracket 14 are rotatably coupled together along one side by a hinge 18. The connector hinge bracket 6 is rotatably coupled at its center to one end of a lower support hinge plate 20. The other end of the lower support hinge plate 20 is rotatably coupled to a fixed support block 22 by a pin 23. A spring 21, through which the pin 23 extends, biases the lower support hinge plate 20 in a clockwise direction.

One end of a tension spring 24 is coupled to the end of the upper arm link 2 which is pivotally coupled to the upper arm medial hinge bracket 8. The other end of the tension spring 24 is coupled to one end of the tension spring 26 by a section of cable 28 which rides on and around a pulley 30 which is rotatably coupled to the upper arm link 2. The other end of the tension spring 26 is coupled to one end of a tension spring 32 by a section of cable 34 which rides on and around a pulley 36 which is rotatably coupled to the upper arm link 4. The other end of the tension spring 32 is coupled to the end of the upper arm link 4 adjacent to the connector hinge bracket 6.

Similarly, one end of a tension spring 38 is coupled to the end of the forearm link 10 adjacent to the camera mounting bracket 16. The other end of the tension spring 38 is coupled to a tension spring 40 by a cable 42 which rides on and around a pulley 44 which is rotatably coupled to the forearm link 10. The other end of the tension spring 40 is coupled to one end of a tension spring 46 by a cable 48 which rides on and around a pulley 50 which is rotatably coupled to the forearm link 12. The other end of the tension spring 46 is coupled to the end of the forearm link 12 adjacent to the forearm medial hinge bracket 14.

A weight, such as a camera which is supported at the support bracket 16, behaves as an object in free space beyond gravity since the upward forces which the tension springs 24, 26, 32 and 38, 40, 46 exert, in effect, counteract gravity. The weight tends to travel in a straight line until influenced otherwise and tends to retain the same angle until influenced otherwise. As a result, the upper arm links 2, 4 roughly correspond to the upper arm of the user and the forearm links 10, 12 roughly correspond to the user's forearm, in terms of their three dimensional geometry, as the support arm is used either high, low, or to either side.

Figure 3A:
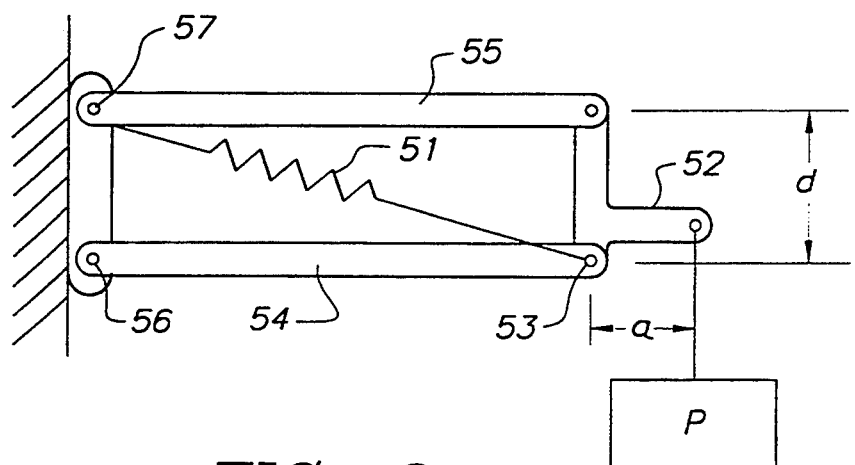
FIGS. 3a and 3b are schematic diagrams showing a mechanical model for the arm links which form the camera supporting apparatus shown in FIGS. 1 and 2

Referring now to FIG. 3, the mechanical and geometric considerations surrounding operations of the support arm links 2, 4 (as well as the support arm links 10, 12) are best described schematically as a four bar mechanism with a diagonal spring 51 for carrying a load of a given weight (see FIG. 3a). In this model, the rightmost end 52 carries a load P. Note that if the load P were placed at the point 53, where the spring 51 joins the lower bar 54, there would be no need for the upper bar 55 and the connecting link 52 between the upper bar 55 and the lower bar 54.

Figure 3B:
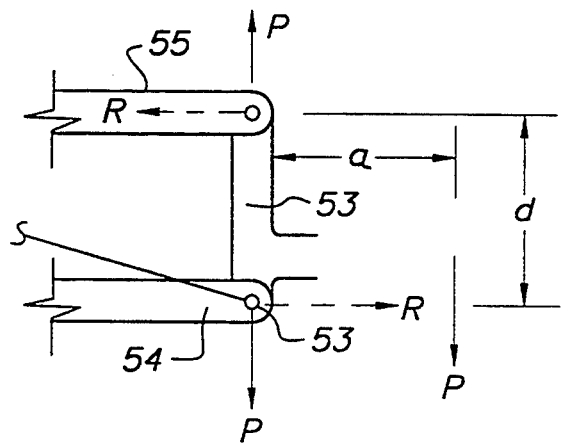
Figure 3D:
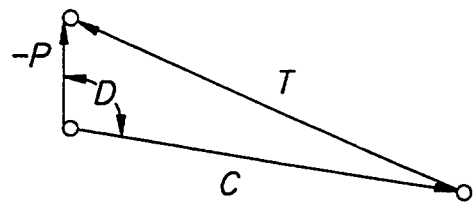
FIGS 3c and 3d are vector diagrams related to the mechanical models of FIGS. 3a and 3b.
Figure 3C:
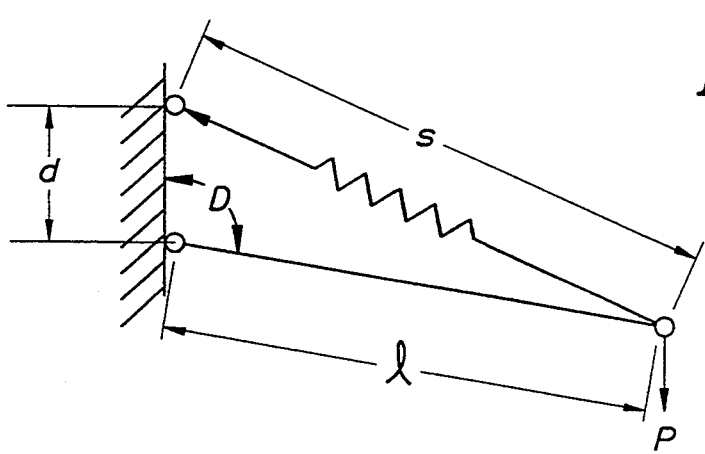

For purposes of analysis, the load P can be replaced by a load and a couple, as shown in FIG. 3b. The upper bar 55 supplies a reactive force R to form the couple Rd, which is equal and opposite to the couple Pa. The moment caused by the couple Pa will be equalized by use of the upper bar 55 in conjunction with the lower bar 54. The analysis can now be simplified by looking at this reduced mechanism, and by considering the load applied at the point 53 where the spring 51 joins the lower bar 54, as shown in FIG. 3c.

To generalize this analysis, an angle D is shown at something other than 90°. The distance d is the separation between the bars 54, 55. The distance l is the separation between the pivots 53, 56 (see FIG. 3a) on the lower bar 54. S is the length of the diagonal (the spring 51). The length S is given by the equation:

$$S = d^2 + l^2 - 2dl \cos D \tag{1}$$

Since all of the pivots are free to rotate, the forces exerted by the various members must act along their axes. Proceeding to a vector analysis, and referring now to FIG. 3d, the force exerted by the lower bar 54 can be represented by a vector C parallel to the lower bar. Likewise, the force exerted by the spring 51 can be represented by a vector T parallel to the spring. The sum of these vectors C, T is a vertical force (−P) equal and opposite to the load P in order to produce equilibrium. The sense of the vectors necessary to achieve this is as shown in FIG. 3d.

It can be seen that since the vectors T and C are parallel to the spring 51 and the lower bar 54, respectively, and since their sum must be vertical, the vector diagram forms a triangle similar to the triangle formed by the physical parts of the arm link mechanism. The sides of these triangles are in the following proportion:

$$\frac{P}{d} = \frac{T}{s} = \frac{C}{l} \tag{2}$$

The forces are proportional to the lengths of the members to which they relate, as follows.

$$T = S\frac{P}{d} \; ; \; C = l\frac{P}{d} \tag{3}$$

The load P to be carried, divided by the separation d between the lower bar 54 and the attachment point 57 (see FIG. 3c) for the spring 51, defines a constant of proportionality.

If the device is a simple truss, with no movement, then no spring is necessary. Rather, a simple bar will do, and the force supplied will be:

$$T = S\frac{P}{d} \tag{4}$$

If the device is to exhibit motion, but equilibrium is required in only one position, then the spring 51 must provide the force:

$$T = S\frac{P}{d} \tag{5}$$

Distances can then be calculated as previously indicated.

However, if, as is preferred in accordance with the present invention, the device is to maintain equilibrium in all positions, the spring 51 must be able to stretch for a distance equal to the length (S) of the diagonal. Some or all of the spring 51 must be placed outside of the diagonal to give it room to stretch. The spring rate K (i.e., the ratio between the spring force and the stretch) is the load P to be carried divided by the distance d:

$$K = \frac{P}{d} \qquad (6)$$

One way to provide sufficient room for expansion of the spring 51, as described in U.S. Pat. No. 4,208,028, is to separate the spring into sections (e.g., the springs 24, 26, 32 of FIG. 2) which are serially connected by cables (e.g., the cables 28, 34 of FIG. 2) which are run over a cooperating series of pulleys (e.g., the pulleys 30, 36 of FIG. 2). One section is placed over the upper bar 55. Another section is placed below the lower bar 54. A third section is placed along the diagonal (between the end points 53, 57). The sum of the distances allowed for each section to stretch must equal the maximum diagonal distance (the length S).

The foregoing describes a system designed to be in equilibrium in all positions for a single load (i.e., an iso-elastic system). If the load is to vary, either the spring rate, the distance d, or both, must change. Referring again to equation (6), K=P/D, where K=spring rate, if K changes, the load P that can be carried changes proportionally, or:

$$P = dK \qquad (7)$$

Similarly, if d changes, P changes proportionally. Since the spring rate K is an inherent characteristic of a given spring, based on its physical properties, changing the spring rate can only be accomplished by changing the springs (which is not easily done).

Figure 4A:
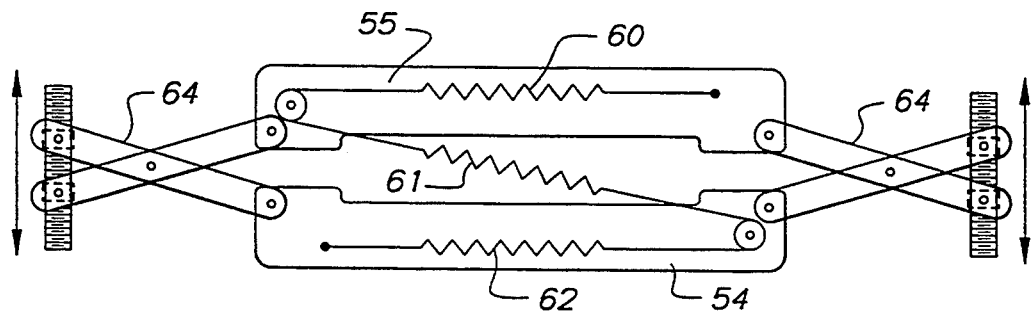
FIGS. 4a and 4b are schematic diagrams showing a first alternative mans for adjusting the physical properties of the arm links.
Figure 4B:
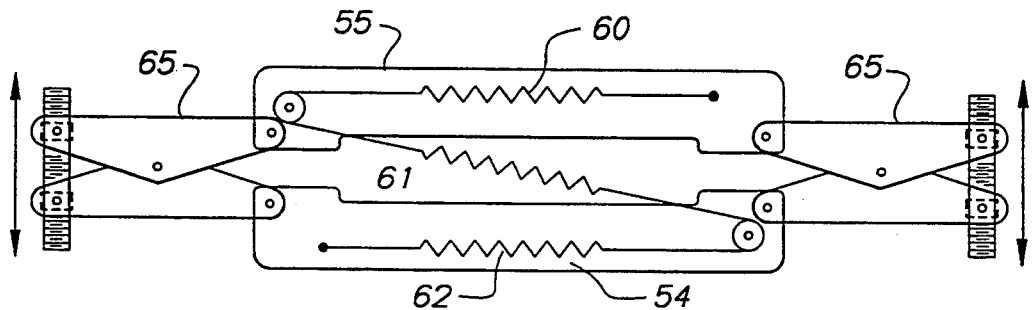
Figure 5A:
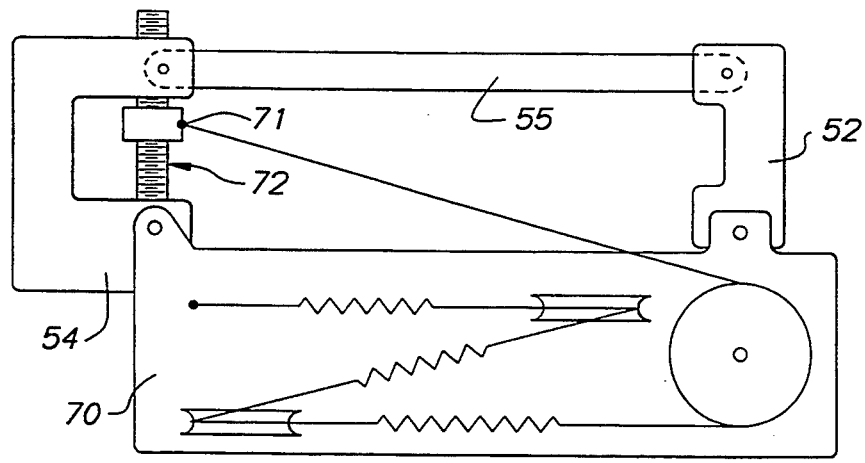
FIGS. 5a and 5b are schematic diagrams showing a second alternative means for adjusting the physical properties of the arm links.
Figure 5B:
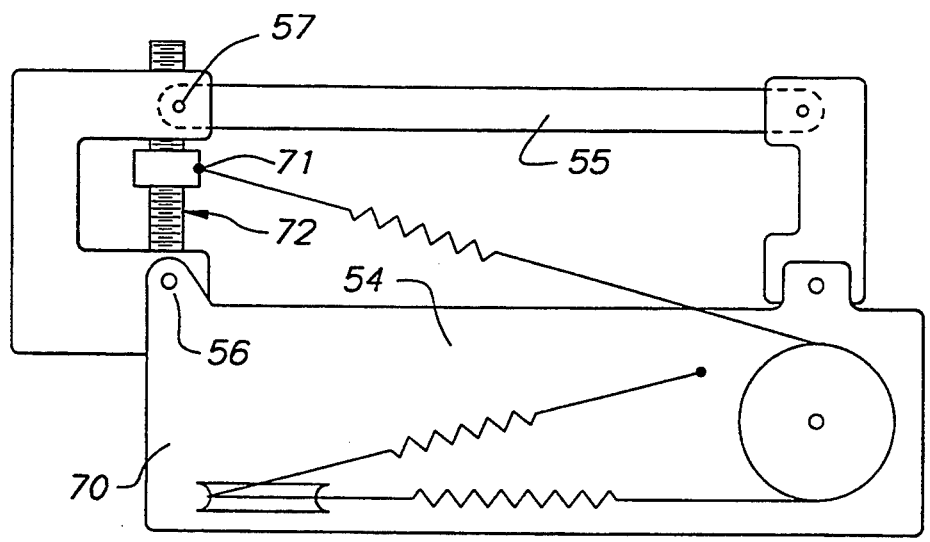

However, in accordance with the present invention it has been found that the distance d is more easily changed, for example, by simple screw adjustments. As shown in FIGS. 4a and 4b, this can be accomplished through an arrangement in which the spring is distributed (sections 60, 61, 62) among the lower and upper bars 54, 55 and the diagonal, and which employs scissors-type mechanisms 64, 65 for adjusting the distance d so that the distance between the lower bar 54 and the upper bar 55 is changed. Alternatively, as shown in FIGS. 5a and 5b, the lower bar 54 can incorporate a canister 70 for holding the necessary spring segments, pulleys and cables, eliminating the need to adjust the distance between the bars 54, 55. Instead, only the point of origin 71 for the spring system needs to be changed in order to adjust the distance d (employing a simple jackscrew adjustment 72, for example). For this reason, and since the several spring segments can further, if desired, be replaced by a single spring of appropriate characteristic, this latter approach is presently preferred.

Figure 5C:
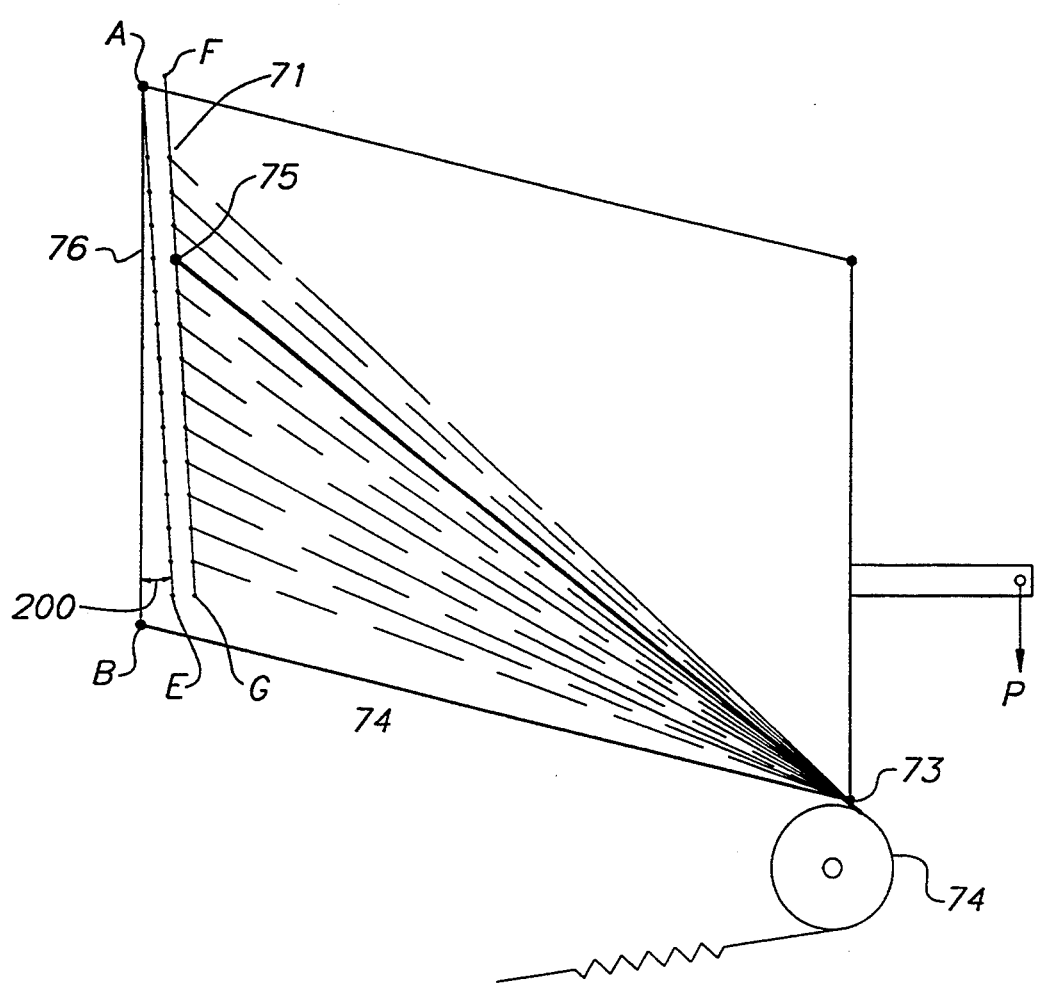
FIG. 5c is a schematic diagram showing how angular and lateral displacement of the path defined for the end-point of the tensioning assemblies of FIGS. 5a and 5b can permit overall control of the level of iso-elasticity, and adjustable control to provide varied iso-elasticity for the support arm.

Referring now to FIG. 5c, the characteristic iso-elasticity of the tensioning assemblies of FIGS. 5a and 5b can be adjusted by an offset in the angle of the termination path established for the point of origin 71 (the endpoint) of the tensioning assembly. Primarily, this offset is measured from the line AB connecting the pivots 56, 57 (see FIG. 3a). The degree of iso-elasticity is also adjustably controlled by an additional parallel offset of the termination path, if desired.

As an example, for a support arm designed to lift between 30 and 50 pounds, it has been determined (empirically) that a nominal angular offset of 5° (as shown by the line AE) provides a consistent iso-elasticity with a modest force of ±2 pounds (up or down) to achieve maximum elevation and maximum depression of the support arm (i.e., responsive to movements of the parallelogram defined by the links and bars of the arm section). It has been found that this angular offset also helps to compensate for slight variations in the distance to the point of origin 71, along the tensioning cable or spring, as the tangent point (ideally coincident with the pivot, at 73) moves around the pulley 74 when the support arm is raised and lowered. Additional lateral displacement of the termination path (e.g., to the line FG) by about 0.125 inches causes the "ride" of the supported mass to be "harder", with a force of ±8 pounds to achieve maximum elevation and maximum depression of the support It has been found that a diagonal tensioning cable or spring will lift at a more efficient angle when attached to a point of origin 75 coincident with the line FG than if it were attached to a point of origin 76 coincident with the line AB. However, the former arrangement would be more suitable for executing a shot from a vehicle, over rough ground. Such an arrangement could also be desirable in situations where the operator does not contemplate raising or lowering (i.e., "booming") the camera during the shot, since reducing iso-elasticity would (more strongly) tend to make the camera seek a given height.

Figure 5D:
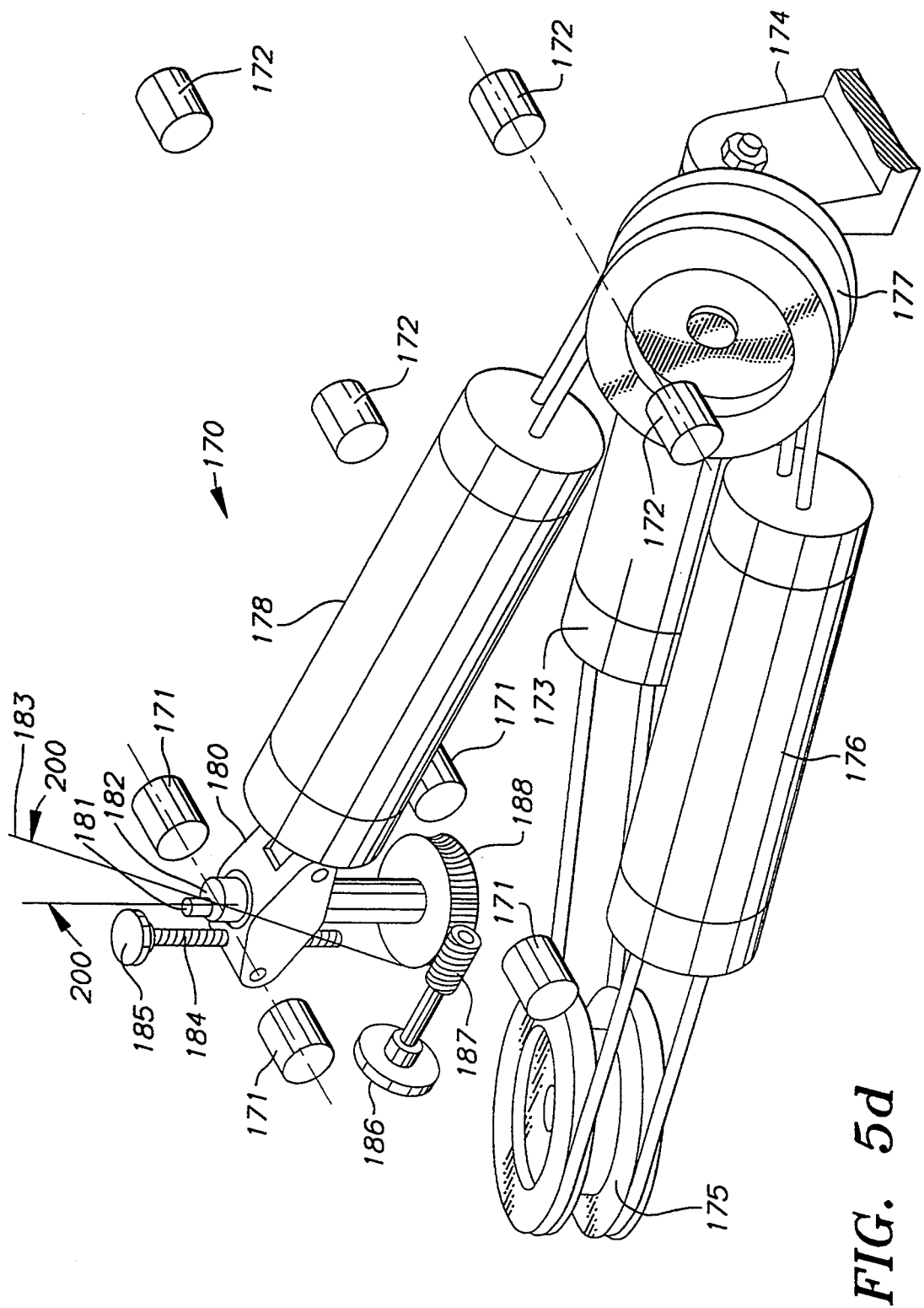
FIG. 5d an isometric view of a tensioning assembly for implementing the adjustments of FIG. 5c, including adjustment of the lifting force and the degree of iso-elasticity of the support arm

FIG. 5d shows a tensioning assembly 170 for implementing the adjustments shown in FIG. 5c. To this end, a series of eight trunnions 171, 172 are schematically shown which define the bearing positions (the pivots) of the parallelogram structure of a support arm section (not shown for purposes of clarity). An end of a first spring segment 173 is fixedly connected to the lower link of the arm section, at 174. The opposite end of the first spring segment 173 is serially connected, through a pulley 175, with a second spring segment 176. The second spring segment 176 is serially connected, through an angled pulley 177, to a third spring segment 178. The third spring segment 178 terminates at a carrier block 180, which constitutes the point of origin 71 previously described.

The carrier block 180 is received by a pin 181 which interfaces with the carrier block 180 through an eccentric 182. The eccentric pin 181 is preferably offset (e.g., by 5°) from a line 183 which vertically bisects a plane connecting the (left-most) trunnions 171. The carrier block 180 is driven along (up and down) the eccentric pin 181 by a lead screw 184. An adjustment knob 185 is provided to rotate the lead screw 184, and accordingly, to vary the effective height of the point of origin 71 of the tensioning assembly. Also provided is an adjustment knob 186, for rotating a worm 187. The worm operates to rotate a worm gear 188, which in turn operates to rotate the eccentric pin 181. This operates to laterally displace the path defined for the carrier block 180, suitably varying (displacing) the point of origin 71 as previously described.

Figure 5E:
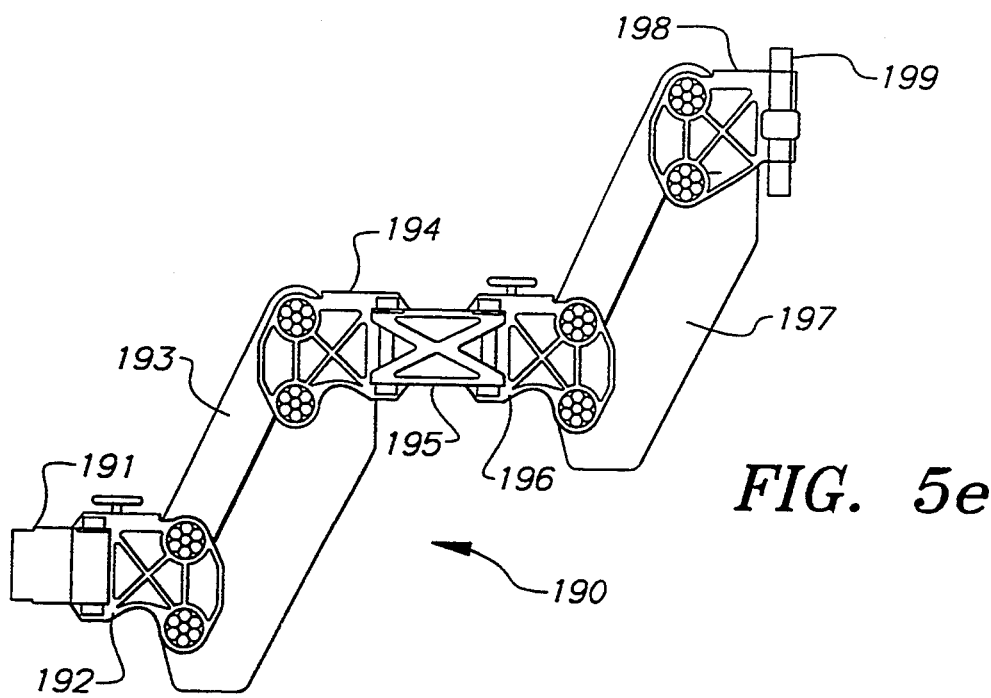
FIG. 5e is a side elevational view of a support arm having an upper arm link and a forearm link including the adjustments of FIG. 5d, with spring covers in place and in a raised position.
Figure 5F:
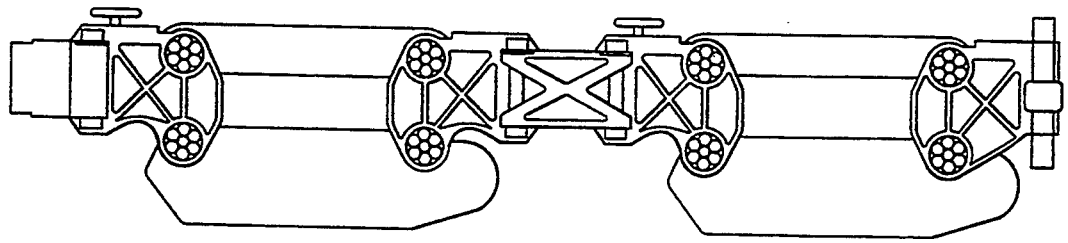
FIG. 5f is a side elevational view of the support arm of FIG. 5e, in an extended position.
Figure 5G:
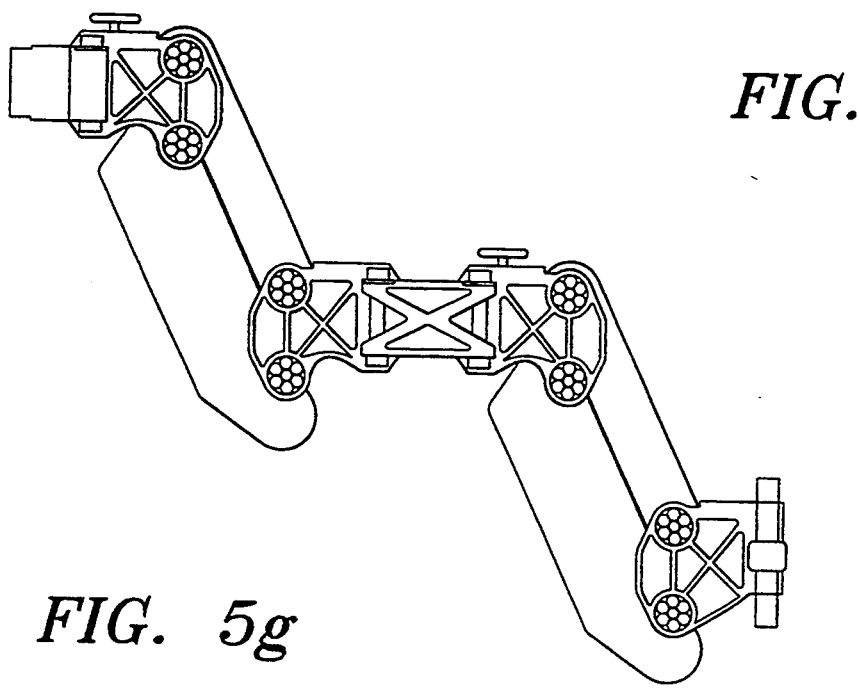
FIG. 5g is a side elevational view of the support arm of FIG. 5e, in a lowered position.

FIG. 5e shows a complete support arm 190 in its maximum lifting position. A connecting block 191 is provided for attaching the support arm 190 to the operator's body brace (not shown), and receives an end block 192 of an upper arm section 193 (defining a first operating parallelogram in accordance with the present invention). The opposite end of the upper arm section 193 includes an end block 194, for connection with a double-acting hinge 195 (which will be discussed more fully below). The double-acting hinge 195 also receives an end block 196 of a forearm section 197 (defining a second operating parallelogram in accordance with the present invention). The opposite end of the forearm section 197 includes an end block 198, which in turn receives a camera mounting post 199 for receiving the mass to be supported by the arm. FIG. 5f shows the support arm 190 at the midpoint of its lift. FIG. 5g shows the support arm 190 in its fully lowered position (i.e., at a 65° depression).

Generally, the lifting capability of the support arm is adjusted for lighter loads by shortening the height of the effective parallelogram defined by a given arm section (upper arm and/or forearm), and vice versa (for heavier loads). This causes a reduction in spring tension, and in the differential in spring stretch throughout the excursion of the defined parallelogram, which increases the effective iso-elasticity of the support arm Referring again to FIG. 5c, angular displacement of the adjustable termination for the end-point 71 (e.g., along the line AE) has its center at the top (A) of, and proceeds in an arc 200 from, the line AB. This displacement alters the angle at which the tensioning assembly effects lift, making the assembly more efficient as the arm section is depressed, and less efficient at full elevation. As a result, this angular offset increases the difference in lifting tensions occurring between upper and lower excursions of the parallelogram (the arm section), progressively reducing iso-elasticity as the support arm is adjusted from its heaviest to its lightest lifting capacity.

Lateral offset of the adjustable termination for the end-point 71 (e.g., along the line FG) causes the resulting path to shift (generally toward the interior of the parallelogram) from the line AE to the line FG. This operates to further decrease overall iso-elasticity by increasing the difference in lift efficiency between upper and lower excursions of the parallelogram (the arm section). As a result, additional force is required to lift the arm to the top position (FIG. 5e), and additional force is required to depress the arm to its lowest excursion (FIG. 5g). This operator-adjustable decrease in iso-elasticity functions approximately evenly throughout the support arm's weight-lifting range.

Further improvements can be achieved in accordance with the present invention by taking advantage of pulley (or drum) ratios. Variations of this approach are possible, depending upon the desired spring configuration.

Figure 6:
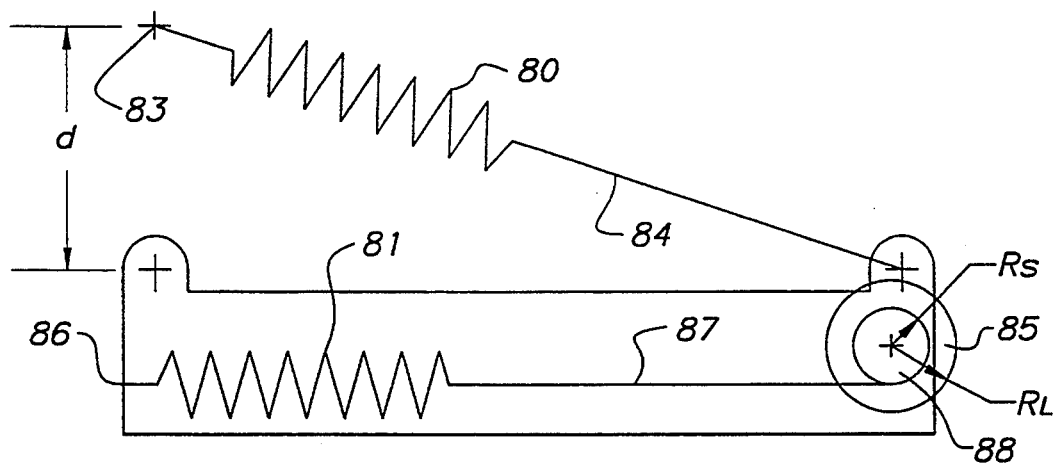
FIG. 6 is a schematic diagram showing a first alternative embodiment, cable and drum arrangement produced in accordance with the present invention.

Referring to FIG. 6, one such approach is to utilize a straight drum ratio. In this embodiment, the spring is split into two sections 80, 81. One spring section 80 extends along the diagonal. The other spring section 81 is housed in a canister 82 associated with the lower bar 54. The illustrated structure is simplified by elimination of the upper bar 55. The diagonal spring 80 terminates at the load adjustment point 83, at one end, and in one or more parallel cables 84, at its other end. The cables 84 wind onto a first drum 85. The spring 81 in the canister 82 terminates at the end 86 of the canister, at one end, and in one or more parallel cables 87, at its other end. The cables 87 wind onto a second drum 88. In this configuration, the drum 88 is smaller in diameter than is the drum 85. The drums 85, 88 are fixed relative to each other, or in practice may be unitary in construction. The use of multiple cables 85, 87 will be discussed more fully below.

The drum ratio R is equal to $R_L/R_S$. The spring rates are selected by means of the equation:

$$1/K = 1/K_D + R^2/K_P \tag{8}$$

wherein:

$K = P/d$ (see equation 6)
$K_D$ = Spring rate of the diagonal spring 80.
$K_p$ = Spring rate of the spring 81 in the canister.

Also to be considered in the selection of springs, such as the springs 80, 81, is that:

1. The diagonal spring 80 must fit in the diagonal when it is stretched to its proper length for the support arm in its uppermost position.
2. The canistered spring 81 must fit in the canister 82 when stretched to its proper length for the support arm in its lowermost position.
3. The force exerted by the diagonal spring 80, in any position, is equal to:

$$S \frac{P}{d} \tag{9}$$

4. The force exerted by the spring 81 in the canister 82, in any position, is equal to:

$$R \times S \frac{P}{d} \tag{10}$$

5. In practice, an appropriate diagonal spring 80 for meeting the first condition above may be found empirically. Its deflection at any position may then be calculated.
6. If the deflection at any position of the diagonal spring 80 is $C_D$, and the deflection of the canistered spring 81 is $C_c$ at that same position, then:

$$C_C = (S - C_D)/R \tag{11}$$

Figure 7:
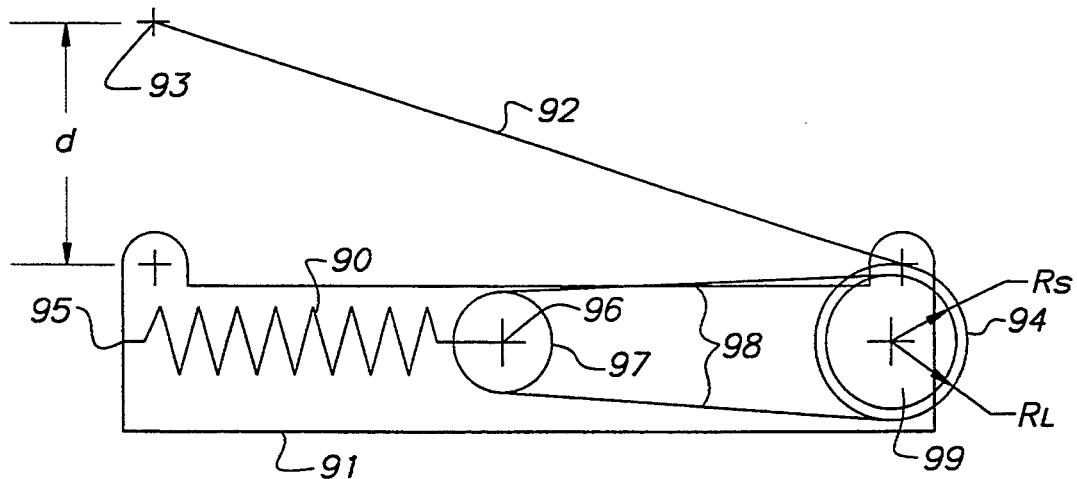
FIG. 7 is a schematic diagram showing a second alternative embodiment, differential drum arrangement produced in accordance with the present invention.

Referring now to FIG. 7, another approach makes use of a differential drum arrangement. This method utilizes only one spring 90, preferably in a canister 91, since very large ratios are made possible with this arrangement. In such case, the diagonal is formed by one or more parallel cables 92, depending on the load to be accommodated, extending from the load adjustment point 93 to a first drum 94. The spring 90 is fixed to one end 95 of the canister 91, at one end, and its free end 96 receives one or more pulleys 97. One or more cables 98, operating in parallel, extend from the drum 94 (from the side opposite the diagonal cable 92), wind once around the pulley 97, and terminate at a second, coaxial drum 99. In this configuration, the drum 99 is smaller in diameter than is the drum 94. There is no relative movement between the drums 94, 99.

Figure 8:
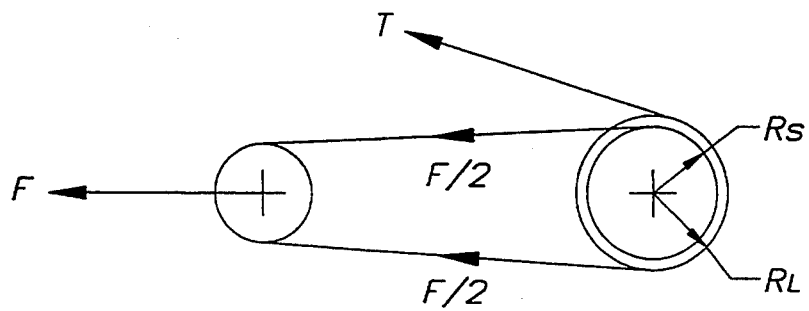
FIG. 8 is a vector diagram related to the schematic illustration of FIG. 7.

The forces operating on the pulley 97 and the differential drum 94, 99 are shown in FIG. 8. T represents the force extending along the diagonal. F represents the force exerted by the spring. The equilibrium equation for the moments about the drums 94, 99 is:

$$T \times R_L = (F/2) \times R_L - (F/2) \times R_S \tag{12}$$

From this, it is determined that:

$$F/T = R_M = (2 \times R_L)/(R_L - R_S) \tag{13}$$

It can be seen that extremely large ratios are obtained with small differences in drum size. Indeed, as the radii of the two drums 94, 99 approach each other, this ratio increases without limit.

The force exerted by the spring 90 is governed by the equation:

$$F = (P/d) \times S \times R_M \tag{14}$$

Deflection of the spring 90 is governed by the equation:

$$C = S/R_M \tag{15}$$

The spring rate is determined by the equation:

$$K = (p/d) \times R_2^M \tag{16}$$

The spring 90, when stretched to its proper length with the support arm in its extreme lower position, must fit within the canister 91, while also allowing clearance for the pulley 97 and drums 94, 99. For heavier loads, toothed sprockets may be substituted for the drums and pulleys, and a chain may be used to replace all or part of the cable. For a camera support system, silent chain is preferably used.

Both the preceding embodiments can be arranged with the canister extending along the upper bar 55, if desired, with the load adjustment point situated at the end of the assembly opposite to the one shown and near the lower bar 54. In such case, the lower bar 54 cannot be eliminated.

As the load increases, the cables may be stressed beyond a safe value. Increasing cable size is possible, but only at the expense of larger pulleys and drums This is not desirable since it makes the device clumsy and difficult to handle. Consequently, in such cases it is preferable to employ plural cables, thereby distributing the load between two or more cables, as desired. In order to share the load equally between such plural cables, some provision must be made to accommodate small differences in cable length. Otherwise, the shorter cable will carry all of the load.

Figure 9:
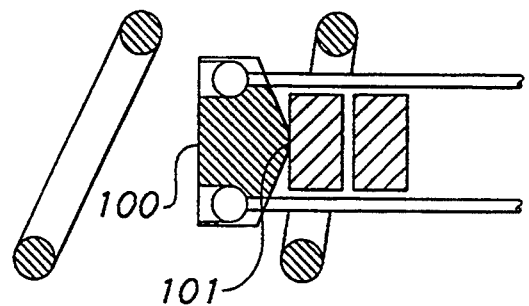
FIGS. 9 10, and 11 are partial, sectional views of adjustment devices for receiving the cables associated with the differential drum arrangement of FIG. 7.
Figure 10:
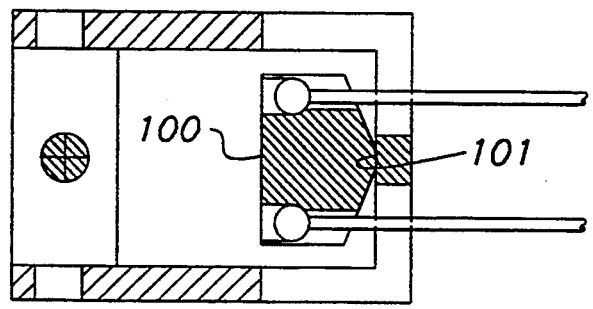

Various means are available for accomplishing this. However, a preferred means for this is to employ a rocker 100 within the spring, with reference to FIG. 9 of the drawings. Rotation of the rocker 100 about the pivot point 101 serves to equalize cable length in straightforward fashion. It is only necessary to accommodate cable length discrepancies at one end of the cable Consequently, if the cable end which receives the spring is compensated, the other end can attach directly, without compensation. For the differential drum configuration of FIG. 7, if plural cables are required for load control, the rocker 100 can be placed at the load adjustment point 93 (see FIG. 10).

Figure 11:
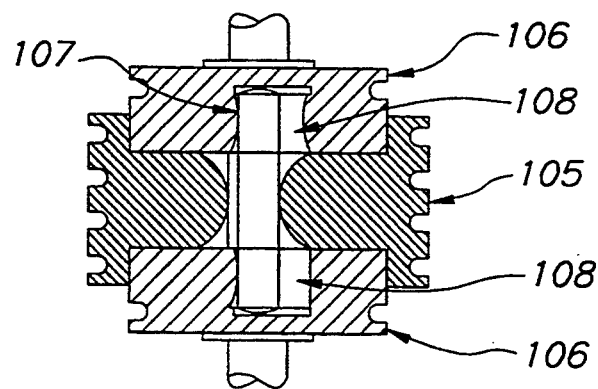

Plural cables that start at the drum 94, wrap around the pulley 97, and terminate at the drum 99, need to be compensated at the drums 94, 99. As shown in FIG. 11, this can be accomplished by making one of the drums a center drum 105, while splitting the other drum into two drum sections 106 placed on either side of the center drum 105. The three drum members are then keyed to each other by means of a dowel 107. The holes 108 for the dowel 107 are bell-mouthed and slightly larger than the dowel 107. This then permits the two outer drums 106 to adjust for differences in cable length.

Figure 12:
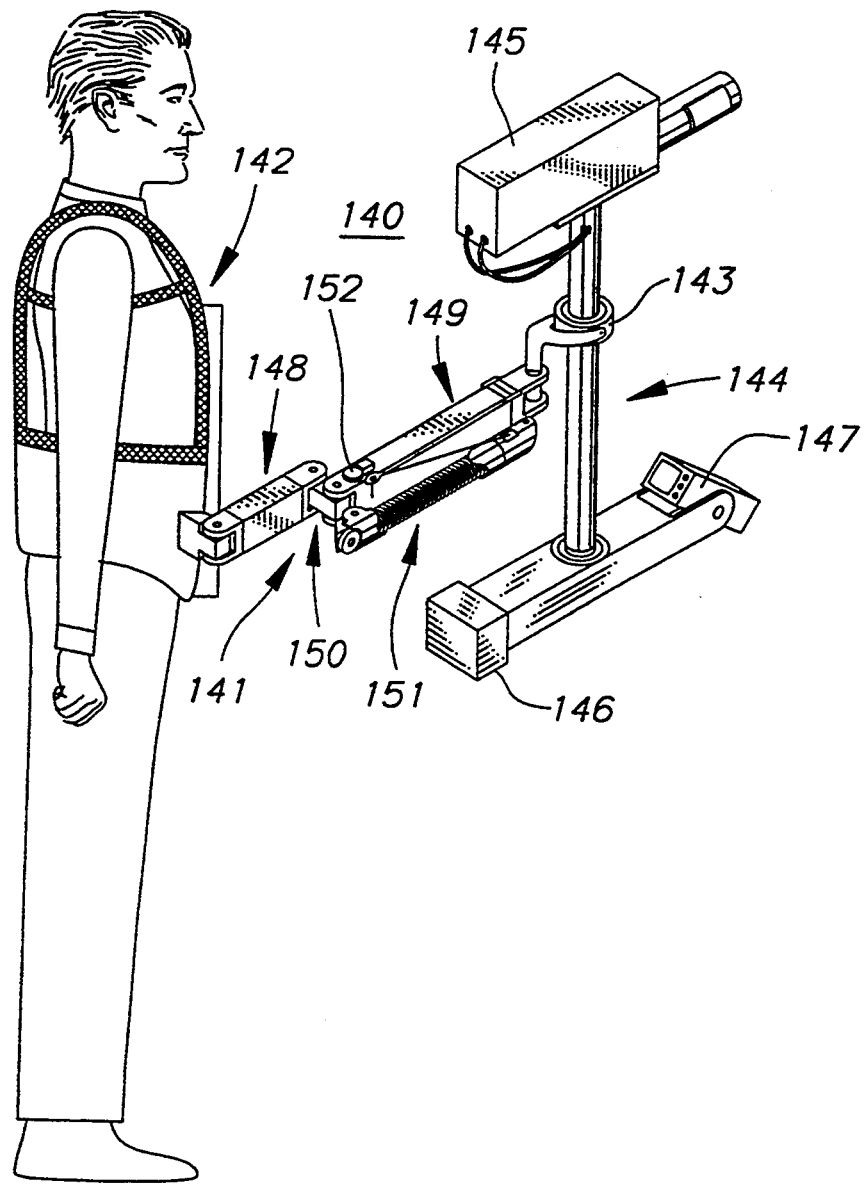
FIG. 12 is a perspective view showing a camera stabilizing support incorporating an arm section fitted with a tensioning apparatus produced in accordance with the present invention.
Figure 13:
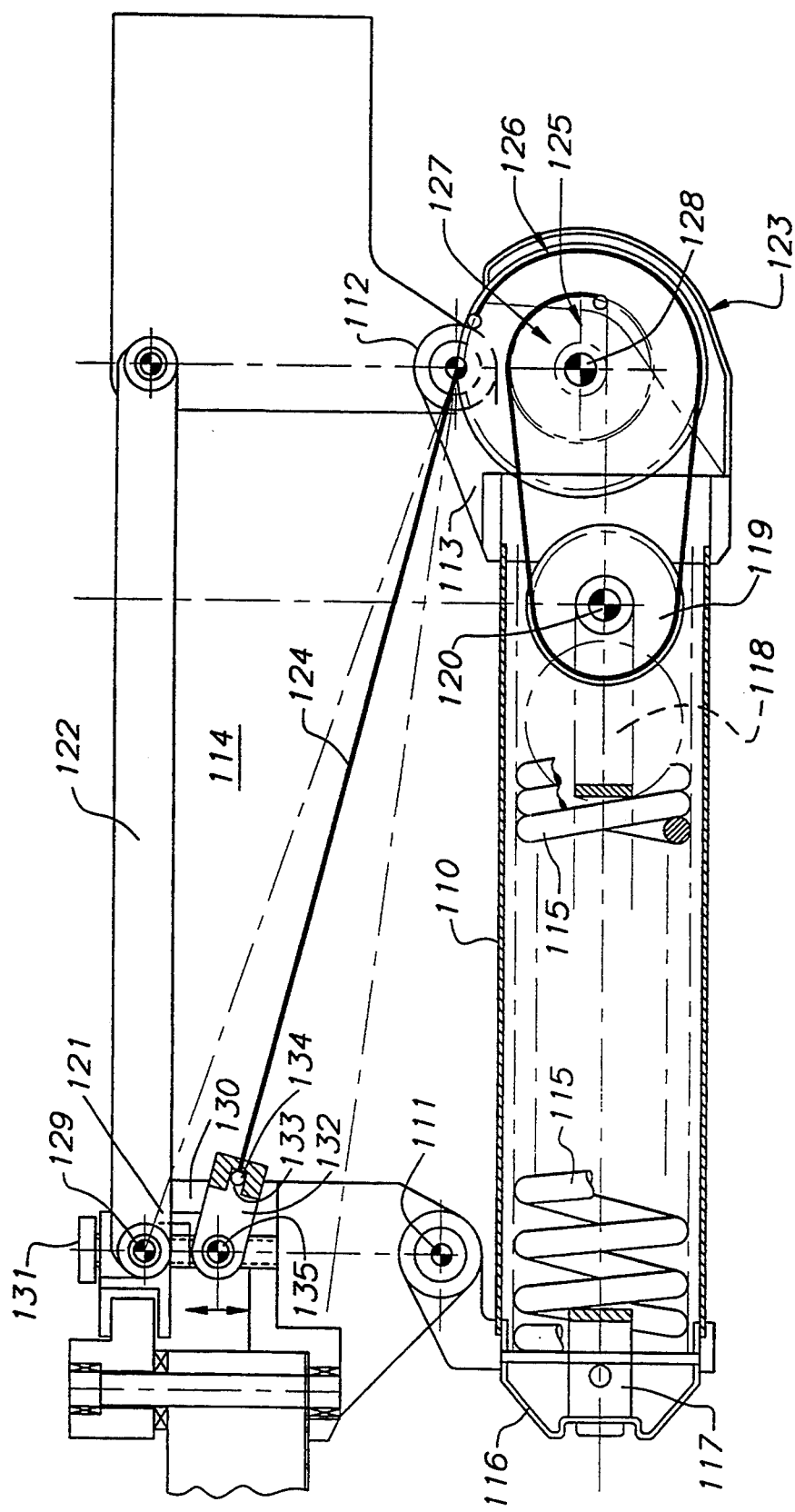
FIG. 13 is a side elevational view of an arm section of the support arm of FIG. 12.
Figure 14:
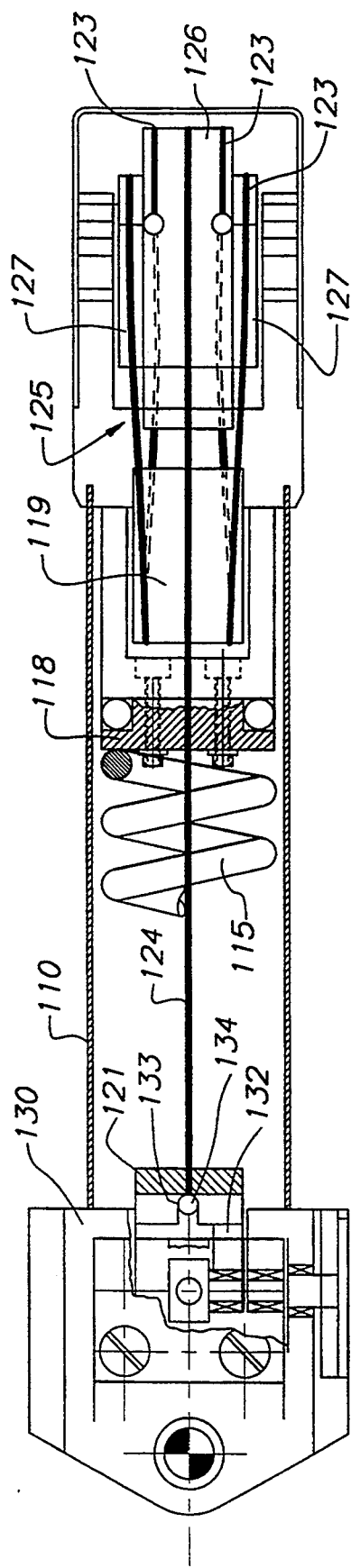
FIG. 14 is a top plan view of the arm section of FIG. 13, showing cable connections.

A practical embodiment incorporating the foregoing improvements is shown in FIGS. 12 to 14. Referring first to FIG. 13, a canister 110 extends along, and is affixed to (at 111, 112) the lower arm link 113 of a section 114 (in this case, the forearm section) of an operative support apparatus. A spring 115 extends longitudinally through the canister 110, and is affixed to one end 116 of the canister 110 by a mounting 117. The opposite end of the spring 115 is engaged by a mounting 118 which, in turn, pivotally receives a pulley 119 which is journalled for rotation at 120.

A series of cables operatively interconnect the pulley 119 (and accordingly, the spring 115) with an adjustable mounting 121 associated with the upper arm link 122. To this end, and referring now to FIGS. 13 and 14, a pair of cables 123 operatively interconnect the pulley 119 and a differential drum 125, while a single cable 124 operatively interconnects the differential drum 125 with the adjustable mounting 121. The differential drum 125 is comprised of a first, centrally located drum 126 and second, outwardly directed drums 127 for receiving the cables 123, 124. The drums 126, 127 are interconnected for rotation, in unison, about an axle 128. To be noted is that the drums 126, 127 have different radii, producing the mechanical advantage which permits the arm section 114 (and accordingly, the support arm) to be effectively controlled with only a single spring 115 rather than the plural springs which were previously required for effective control of such arm sections (and the support arm).

The adjustable mounting 121 is located at the load adjustment point for the arm section 114 (i.e., the load adjustment point 83, 93), and is in general alignment with the adjacent pivot 129 associated with the upper arm link 122. The adjustable mounting 121 generally includes a fixed housing 130 which receives an adjustment screw 131 (or in the alternative, an adjustment knob) which engages a swivel mounting 132. The swivel mounting 132 incorporates a recess 133 for receiving the end 134 of the cable 124, completing the operative interconnections between the tensioning apparatus and the arm section 114. The adjustment screw 131 variably engages the swivel mounting 132 (i.e., a jackscrew fitting), moving the swivel mounting 132 along a line which extends through the pivot 129 of the upper arm link 122. The swivel mounting 132 rotates about a pivot, at 135, to accommodate variations in the angle assumed by the cable 124 responsive to adjustments of the screw 131. Varying the "height" of the swivel mounting 132 relative to the pivot 129 of the upper arm link 122 causes adjustment of the arm section 114 to accommodate loads (e.g., a camera) of different weight placed upon the support apparatus.

FIG. 12 shows a camera stabilizing apparatus 140 which incorporates the tensioning system illustrated in FIGS. 13 and 14. As is conventional, a support arm 141 interconnects a harness 142 to be worn by a camera operator and a gimbal 143 for supporting a frame 144 which receives a camera 145 and its associated components, such as a battery pack 146 and monitor 147. The support arm 141 is comprised of two arm sections 148, 149 joined at a hinged connection 150. The arm section 149 includes a tensioning system 151 such as is illustrated in FIGS. 13 and 14, and an adjustment knob 152 (which substitutes for the adjustment screw 131) which permits adjustment of the support arm 141 to the weight (the camera 145, the battery pack 146, the monitor 147, etc.) which it is to support. This can be done without having to change any springs, or the configuration of the frame, permitting simple and straightforward field adjustments when in use.

In this embodiment, as well as in the embodiment of FIG. 2, the support arm is comprised of two arm sections (in the present embodiment, the arm sections 148, 149; in the embodiment of FIG. 2, the arm section including the arm links 2, 4 and the arm section including the arm links 10, 12) connected together so that they may rotate about each other in the horizontal plane. Two improvements are noteworthy here.

First, the foregoing improvements are applicable either to the upper arm section 148, the forearm section 149, or both, as desired. If either of the arm sections is not provided with a tensioning system produced in accordance with the present invention, it may in the alternative be provided with a tensioning system produced in accordance with that shown in U.S. Pat. No. 4,208,028, or may be substituted with a passive link in place of the active section forming the support arm. The support arm 141 shown in FIG. 12 includes an active forearm section 149 and a passive upper arm section 148. It is also possible to provide an active upper arm section 148 and a passive forearm section 149, or an active upper arm section 148 and an active forearm section 149, as desired.

Second, in interconnecting the arm sections of the support arm, a simple hinge was originally provided (see FIG. 2). This allowed the two arm sections to rotate from a position virtually doubled back on each other to a virtually in-line position. It was later decided that it would be desirable to be able to rotate through the in-line position to a position doubled back on the other side, to permit a rotation of 360 degrees.

Figure 15:
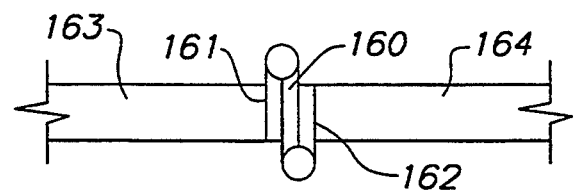
FIG. 15 is a schematic plan view of a hinge for interconnecting the arm sections of the support arm.
Figure 17:
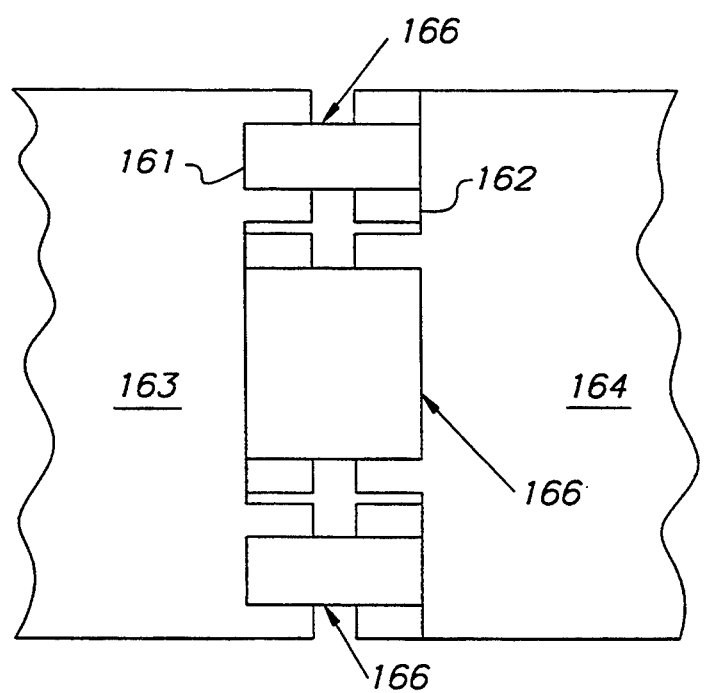

As is schematically shown in FIG. 15, this is accomplished by adding a link 160 that connects the ends 161, 162 of the two arm sections 163, 164 at their vertical centers. In order to permit the support arm to rotate completely, the length of the link 160 must be slightly greater than the width of the arm sections 163, 164, which causes an increase in the extended length of the support arm. Referring to FIGS. 16 and 17, this increase in extended length is reduced, while still allowing 360 degrees of rotation, by providing hinge pin holes 165 in the end pieces 161, 162 of the arm sections 163, 164, which then receive center leaves 166 for interconnecting the arm sections 163, 164. Either two or three center leaves 166 can be provided, which cross each other. The illustrated embodiment shows a three leaf arrangement. The crossed hinge leaves 166 are provided to prevent the arm sections 163, 164 from stretching apart while eliminating the need for two mounting leaves (as in FIG. 15), thereby reducing the extended length of the support arm.

To be noted is that no springs are used in this device. The use of springs would provide a favored position for the hinge, and prevent sag. However, in the present situation, such a favored position is not desired since it would impede smooth movement between the two arm sections.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. A weight support apparatus especially adapted for operation as a portable device on a moving carrier which is capable of being hand-guided by an operator in substantially free-floating manner to also isolate the weight from unwanted lateral and vertical movement caused by the motion of the carrier, which apparatus comprises:
weight support means for connection to and adapted to support at least part of the weight, which means is further adapted for connection to the carrier, and including a pair of support sections interconnected by a hinge, wherein at least one of the support sections includes a series of pivotally interconnected links;
tensioning means connected to the support section including the series of links for providing forces for weight support; and
means for adjusting the tensioning means to provide weight support forces which are contoured to articulation of the weight support means for lateral and vertical movements of the weight support means.

2. The support apparatus of claim 1 wherein the weight support means includes a forearm section for receiving the weight to be supported and an upper arm section for engaging the moving carrier.

3. The support apparatus of claim 2 wherein only the upper arm section includes a series of pivotally interconnected links defining a parallelogram and adjustable tensioning means for providing forces for weight support.

4. The support apparatus of claim 2 wherein only the forearm section includes a series of pivotally interconnected links defining a parallelogram and adjustable tensioning means for providing forces for weight support.

5. The support apparatus of claim 2 wherein the upper arm section and the forearm section both include a series of pivotally interconnected links defining a parallelogram and adjustable tensioning means for providing forces for weight support.

6. The support apparatus of claim 1 wherein the adjusting means provides weight support forces which are substantially constant during the articulation of the weight support means.

7. The support apparatus of claim 1 wherein the adjusting means provides weight support forces that vary during the articulation of the weight support means.

8. The support apparatus of claim 1 wherein the adjusting means includes means for adjusting an attachment point connecting the series of interconnecting links and the tensioning means.

9. The support apparatus of claim 8 wherein the attachment point is movable along a first link of the series of interconnected links.

10. The support apparatus of claim 9 wherein the attachment point is movable along a first axis defining an angle with a second axis in alignment with opposing pivot points of the first link.

11. The support apparatus of claim 10 wherein the angle is-fixed.

12. The support apparatus of claim 11 wherein the angle is about 5°.

13. The support apparatus of claim 10 wherein the first axis passes through one of the opposing pivot points, adjacent to the adjusting means.

14. The support apparatus of claim 13 wherein the adjusting means includes a rod for slidingly engaging a carrier block which receives the tensioning means.

15. The support apparatus of claim 14 wherein the carrier block is adjustably movable along the rod.

16. The support apparatus of claim 15 which further includes a threaded adjustment screw for engaging the carrier block and for moving the carrier block along the rod.

17. The support apparatus of claim 10 wherein the first axis is laterally displaceable from a first position to a second position substantially parallel to the first position.

18. The support apparatus of claim 17 wherein the adjusting means includes a rod for slidingly engaging a carrier block which receives the tensioning means.

19. The support apparatus of claim 18 wherein the carrier block is adjustably movable along the rod.

20. The support apparatus of claim 19 which further includes a threaded adjustment screw for engaging the carrier block and for moving the carrier block along the rod.

21. The support apparatus of claim 20 which further includes means for adjusting the lateral displacement of the first axis.

22. The support apparatus of claim 21 wherein the rod has an eccentric portion for engaging the carrier block, and means for varying the eccentric portion of the rod relative to the carrier block.

23. The support apparatus of claim 22 wherein the varying means includes an adjustment screw for engaging the rod, and for rotating the rod to vary the position of the eccentric portion of the rod.

24. The support apparatus of claim 9 wherein the tensioning means includes a first spring attached to and extending along a second link of the series of interconnecting links which is adjacent to and pivotally connected to the first link, a first pulley for receiving a cable extending from and between the first spring and a second spring extending along the second link, a second pulley for receiving a cable extending from and between the second spring and a third spring extending from the second drum to the attachment point.

25. The support apparatus of claim 9 wherein the attachment point is movable along an axis in alignment with opposing pivot points of the first link.

26. The support apparatus of claim 25 wherein the tensioning means includes a spring attached to and extending along a second link of the series of interconnecting links which is adjacent to and pivotally connected to the first link, and a drum for receiving a cable extending from and between the spring and the attachment point.

27. The support apparatus of claim 26 wherein the drum includes a first radius for receiving a first cable which engages the spring and a second radius for receiving a second cable which engages the attachment point.

28. The support apparatus of claim 27 wherein the first radius is smaller than the second radius.

29. The support apparatus of claim 28 which further includes an additional spring connected in series between the attachment point and the second radius of the drum.

30. The support apparatus of claim 28 which further includes a pulley which engages an end of the spring and which receives the first cable extending from the drum.

31. The support apparatus of claim 26 wherein a plurality of cables in parallel interconnect portions of the tensioning means.

32. The support apparatus of claim 31 wherein a plurality of cables in parallel interconnect the spring and the drum.

33. The support apparatus of claim 31 wherein a plurality of cables in parallel interconnect the attachment point and the drum.

34. The support apparatus of claim 31 which further includes means for equalizing cable lengths of the plurality of cables in parallel interconnection.

35. The support apparatus of claim 34 wherein the equalizing means is a rocker for receiving the plurality of cables at opposing ends of the rocker.

36. The support apparatus of claim 34 wherein the equalizing means is an eccentric interconnecting central portions of the drum for receiving one of the cables, and outer portions of the drum for receiving another one of the cables.

37. The support apparatus of claim 1 wherein the hinge is a double action hinge.

38. The support apparatus of claim 37 wherein the double action hinge permits rotation of the support sections relative to one another for substantially 360 degrees.

39. The support apparatus of claim 37 wherein the double action hinge includes apertures in ends of the support sections for receiving a plurality of leaves for interconnecting the ends of the support sections and which cross each other.

40. A method for adjusting a weight supporting apparatus produced according to claim 1, comprising the step of adjusting the tensioning means to provide forces for weight support which are substantially constant during articulation of the weight support means for all lateral and vertical movements of the weight support means.

* * * * *